United States Patent [19]
Braschel et al.

[11] Patent Number: 5,233,529
[45] Date of Patent: Aug. 3, 1993

[54] AUTOMATIC ANTI-SKID BRAKE CONTROL SYSTEM

[75] Inventors: Volker Braschel; Dieter Seitz, both of Neuwied, Fed. Rep. of Germany

[73] Assignee: Robert Bosch GmbH, Stuttgart, Fed. Rep. of Germany

[21] Appl. No.: 918,920

[22] PCT Filed: Jan. 22, 1988

[86] PCT No.: PCT/EP88/00046
§ 371 Date: Aug. 7, 1989
§ 102(e) Date: Aug. 7, 1989

[87] PCT Pub. No.: WO88/06544
PCT Pub. Date: Sep. 7, 1988

Related U.S. Application Data

[63] Continuation of Ser. No. 392,932, Aug. 7, 1989, abandoned.

[30] Foreign Application Priority Data

Feb. 28, 1987 [DE] Fed. Rep. of Germany ....... 3706514

[51] Int. Cl.⁵ .............................................. B60T 8/66
[52] U.S. Cl. ................... 364/426.02; 303/95; 303/103
[58] Field of Search ............ 364/426.02, 426.03; 303/95, 97, 103, 106; 180/197

[56] References Cited

U.S. PATENT DOCUMENTS

| | | | |
|---|---|---|---|
| 4,718,013 | 1/1988 | Kubo | 303/95 |
| 4,736,994 | 4/1988 | Fennel et al. | 364/426.02 |
| 4,818,037 | 4/1989 | McEnnan | 303/97 |
| 4,848,850 | 7/1989 | Yoshino | 303/97 |
| 4,859,002 | 8/1989 | Yoshino | 303/97 |

Primary Examiner—Gary Chin
Attorney, Agent, or Firm—Felfe & Lynch

[57] ABSTRACT

An anti-skid brake control system for a motor vehicle includes wheel sensors for producing signals representative of the rotational speed of each road wheel; an evaluation circuit responsive to the wheel speed signals for determining a reference speed that approaches the speed of the vehicle and for producing brake pressure control signals, in dependence upon the reference speed and the road wheel speeds; and a brake pressure controller responsive to the brake pressure control signals for varying the brake pressure applied to the road wheels. The evaluation circuit includes means for determining the vehicle speed from the average increase of the reference speed and this vehicle speed, so determined, is used to determine an increase in the value of the reference speed during periods of braking instability.

9 Claims, 4 Drawing Sheets

AUTOMATIC ANTI-SKID BRAKE CONTROL SYSTEM

This application is a continuation of application Ser. No. 07/392,932, filed Aug. 7, 1989 now abandoned.

BACKGROUND OF THE INVENTION

1. Field of the Invention

The present invention relates to an automatic anti-skid brake control system for a motor vehicle. More particularly, the present invention relates to an anti-skid brake control system which includes wheel sensors for determining the speed of each individual vehicle wheel, an evaluation circuit to which the wheel speed sensor signals are applied and which generates brake pressure control signals as a function of the wheel speeds, and brake pressure control valves, responsive to the brake pressure control signals, for varying the brake pressure at the vehicle wheels. In the evaluation circuit, the wheel speed signals are used to obtain at least one reference speed value that approximates the vehicle speed characteristics so as to determine the slippage of any wheel. Such slippage, together with the wheel speed signals and the vehicle deceleration, is used to control the brake pressure.

2. Prior Art

The German patent publication No. 2,313,763, to which U.S. Pat. No. 3,907,378 corresponds discloses an automatic anti-skid brake control system of the aforementioned type. This automatic anti-skid brake control system, which also generates slippage signals and therefore requires a reference speed, is provided with a vehicle deceleration sensor which is used to determine, in short repeated intervals, whether the braking effect of the vehicle is more efficient with or without the anti-skid control. In this case, the vehicle deceleration sensor consequently serves to monitor the anti-skid control.

It is also known from the German patent publication No. 2,558,712, to which U.S. Pat. No. 4,053,188 corresponds to formulate the reference speed which is required for slippage control by referring to the speed signals of two or more wheels included in the control system and to select for reference speed formulation the most rapidly turning wheel. The wheel speed signals $V_R$ trigger the possibly necessary slope of the reference speed signals either without modification or with at least one prescribed slope. To decrease the reference speed $V_{Ref}$ in case of instability ($V_R < V_{Ref}$), there are several slopes which can be activated as a function of the determined rotational behavior of the wheel slope according to a prescribed algorithm.

SUMMARY OF THE INVENTION

It is an object of the invention to obtain a reference speed value for an Anti-skid brake control system with more simple means than in conventional systems while improving the match correlation to the actual vehicle speed characteristics.

This object, as well as other objects which will become apparent from the discussion that follows, are achieved, according to the present invention, by determining the vehicle deceleration from the average slope of the reference speed value and by using this vehicle deceleration, so determined, to determine the slope of the reference speed value during periods of braking instability.

It is of importance in the invention that the vehicle deceleration derived from the reference speed, in turn, affects the (negative) slope of this reference speed in case of instability ($V_R < V_{Ref}$). A particularly favorable reference speed value formulation is achieved if the negative slope of the reference speed is selected during instability phases so as to be slightly higher (by a certain value or percentage of e.g. 10-20%) than the vehicle deceleration; i.e., the reference speed is reduced slightly more than is the vehicle speed. The effects which vehicle deceleration and slope of the reference speed have on each other result in a progressive change for both values. In particular, a higher deceleration causes a greater slope of the reference speed and vice versa. Here, the reference speed can hardly surpass the vehicle speed. The value by which the negative slope of the reference speed is selected to be greater than the calculated deceleration can be made a function of the pressure increase period, e.g. the number of the pressure increase pulses after a pressure drop (value increases with the number of pulses). A positive change in coefficient of friction $\mu$ can thus be more easily registered and during long phases of instability on a low $\mu$, the slope of the reference speed rises only slowly.

As mentioned above, a so determined vehicle deceleration can also be used for other control purposes; e.g., monitoring the control.

In addition to road conditions to which a $\mu$ slippage curve with a distinctive maximum corresponds, there are also road conditions where the friction coefficient $\mu$ constantly rises with an increasing slippage. As will be shown hereinafter, if the calculated vehicle deceleration has reached values which are too high, the wheels will steadily increase their slippage in this case and finally lock. Since the vehicle deceleration was calculated too high, the pressure drop is too insensitive for the actual friction characteristics of the road. The brake pressure drops only to an extent such that the circumferential deceleration of the wheel does not continue to increase.

However, in most of the cases, this does not suffice to significantly reaccelerate the wheel. Therefore, in order to achieve a sufficiently high wheel acceleration, the calculated vehicle deceleration must be corrected such that it conforms with the actual vehicle deceleration.

In order to achieve this correction, an improvement of the invention compares the calculated vehicle deceleration with the deceleration of one or several wheels and prevents the subsequent pressure build-up at the moment when the calculated vehicle deceleration surpasses the wheel deceleration. Since a stable running wheel cannot have a higher deceleration than the vehicle deceleration, such a condition is practically impossible and, if it occurs, it must have been caused by a miscalculation of the vehicle deceleration. Due to the undesired pressure drop the wheel does not reenter into a higher slippage. The reference speed runs against the wheel circumferential speed and is supported by the latter. The calculated vehicle deceleration is thus corrected towards a value approaching the actual vehicle deceleration.

Today it is very common to equip vehicles with a so-called emergency wheel as a spare wheel. This emergency wheel is usually smaller in diameter and consequently rotates faster than a normal wheel. Including this speed in the reference value is formed—especially if maximum value formation is done— results in a false reference value which causes underbraking.

In accordance with the improvement of the invention, a supplementary reference speed is formed in addition to the reference speed so as to avoid this disadvantage. For the formation of this supplementary reference speed, the most rapidly rotating wheel determines the increase. The vehicle deceleration is derived from this supplementary reference speed as described below.

However, for the formation of the actual reference speed for the slippage, the value thereof is determined by the second fastest wheel. As compared to this, the vehicle deceleration derived from the supplementary reference speed is used to determine the slope during instability phases.

Therefore, it is here possible to derive a reference speed from the speed of each individual wheel and to only manipulate the slope thereof during the instability phases by means of the vehicle deceleration derived from the supplementary reference speed.

For a full understanding of the present invention, reference should now be made to the following detailed description of the preferred embodiments of the invention and to the accompanying drawings.

DESCRIPTION OF THE PREFERRED EMBODIMENTS

Figure 1:
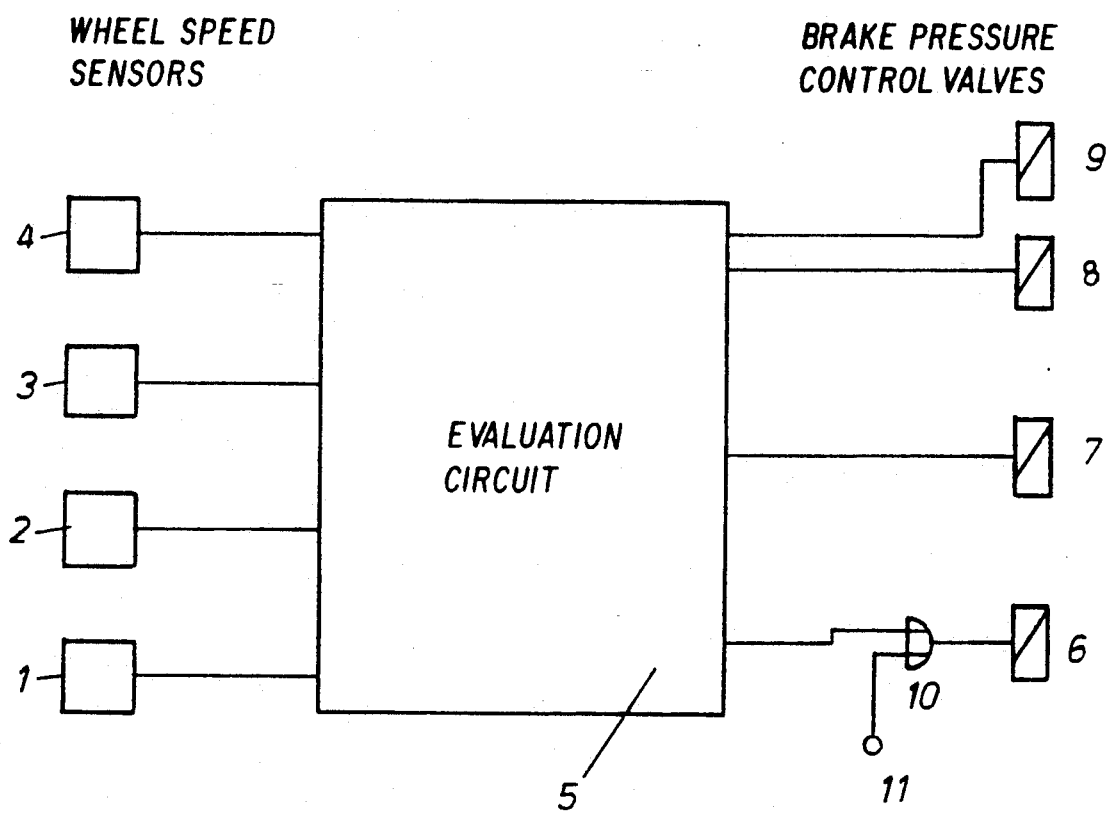
FIG. 1 is a block diagram of an anti-skid brake control system of the type to which the present invention relates.

FIG. 1 shows the components of an anti-skid brake control system. Reference numerals 1–4 designate the four speed sensors, assigned to the four vehicle wheels, which determine the wheel speeds.

An evaluation circuit to which the speed signals of the sensors 1–4 are applied is indicated by block 5 and four solenoid valves for brake pressure variation, which are activated by brake pressure control signals generated by the evaluation circuit 5, are indicated by the blocks 6–9. An OR-gate 10 included in the circuit of FIG. 1 will be discussed hereinafter.

The evaluation circuit 5 generates slippage signals $s_1$ to $s_4$ in addition to other signals. These slippage signals are used in the activating logic of the circuits for the formation of the activating signals for valves 6 to 9. The slippage signals $s_1$ to $s_4$ are derived from the speed signals from the sensors 1 to 4 assigned to these wheels. These speed signals are designated as $V_{R1}$, $V_{R2}$, $V_{R3}$, and $V_{R4}$, respectively.

Figure 2:
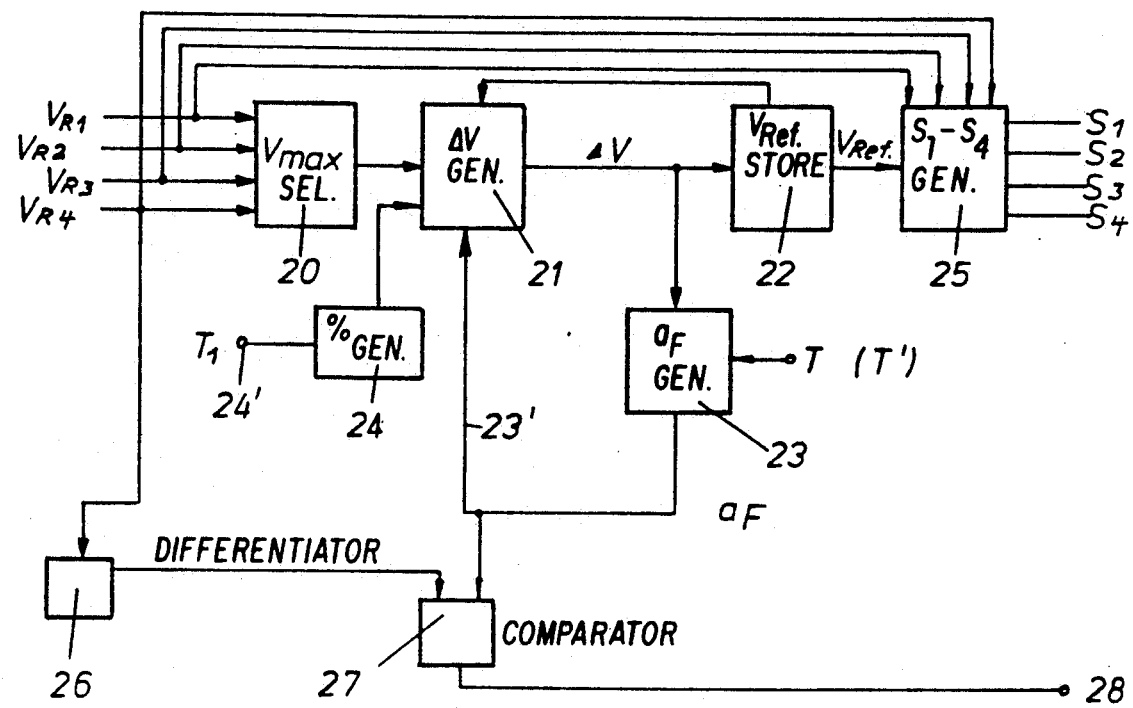
FIG. 2 is a block diagram of a portion of the evaluation circuit of FIG. 1 which provides the reference speed value in accordance with the invention.

FIG. 2 illustrates a possible circuit for slippage signal formation.

In this circuit, the highest value $V_{max}$ is filtered out of the four wheel speed signals $V_{R1}$ to $V_{R4}$ in a unit 20 and supplied to a unit 21 where the momentary reference speed $V_{Ref}$ is generated. To accomplish this, the previously determined reference speed value, which is stored in a unit 22, is also required. Furthermore, in case of instability, the vehicle deceleration $a_f$ is also required which is supplied via line 23'. Finally, a value is entered into a unit 21 via unit 24 which determines by how much (by what percentage) the slope of the reference speed must be increased with respect to the vehicle deceleration. A value $T_A$ supplied via terminal 24' varies the percentage as a function of the brake pressure build-up time.

A change value $\Delta_V$ is generated in unit 21 such that, based on the reference speed value determined in the preceding cycle time, in case the value $V_{max}$ surpasses this reference, the reference speed value is increased according to the value $V_{max}$, and in the case of instability ($V_{max} < V_{Ref}$), the reference speed value is reduced according to the vehicle deceleration $a_f$ supplied via line 23', considering the percentage determined by the unit 24.

The difference $\Delta_V$ between successively determined reference speed values is supplied to a unit 23 as well as to a unit 22 which corrects the old reference value. The momentarily present reference speed value $V_{Ref}$ is supplied to a unit 25 to which the wheel speed signals $V_{R1}$ to $V_{R4}$ are also applied so as to generate the slippage values $s_1$ to $s_4$.

The vehicle deceleration $a_F$ is generated in the unit 23 and supplied to the unit 21. This generation of $a_F$ can be carried out in different ways: Several successively generated $\Delta_V$ values determined during a cycle time T can be summed up and output as vehicle deceleration at the end of this time T. In order to improve the measurements, different cycle times can be employed such that different cycles times are used for adding and, if necessary, different vehicle decelerations are successively output. This permits using a shorter cycle times when the control is not employed.

However, it is also possible to provide the unit 23 with a number of memories where the $\Delta_V$ values can be successively stored. Every new $\Delta_V$ value is then substituted in place of the oldest stored value. A new vehicle deceleration can be output after each newly stored $\Delta_V$ value (cycle time of the $\Delta_V$ calculation), thereby avoiding waiting until the end of a cycle time t which is a multiple of the cycle times T.

It is also possible to sum up in unit 23 all incoming $\Delta_V$ values, to divide the total of the values by a prescribed value then to deduct the result thereof from the previously determined total, and to output the difference as the new vehicle deceleration. In this case, too, the result is one new vehicle deceleration value per interval of the cycle time T (of the processor).

Further, it is indicated in FIG. 2 that a brake pressure drop can be prevented if the wheel deceleration is smaller than the vehicle deceleration.

For this purpose, the wheel speed signal is differentiated (unit 26) and compared to the vehicle deceleration in unit 27. If the vehicle deceleration signal surpasses the wheel deceleration signal, the comparator 27 produces a signal which is supplied via a terminal 28 to the terminal 11 and to the OR-gate 10 of FIG. 1.

Figure 3:
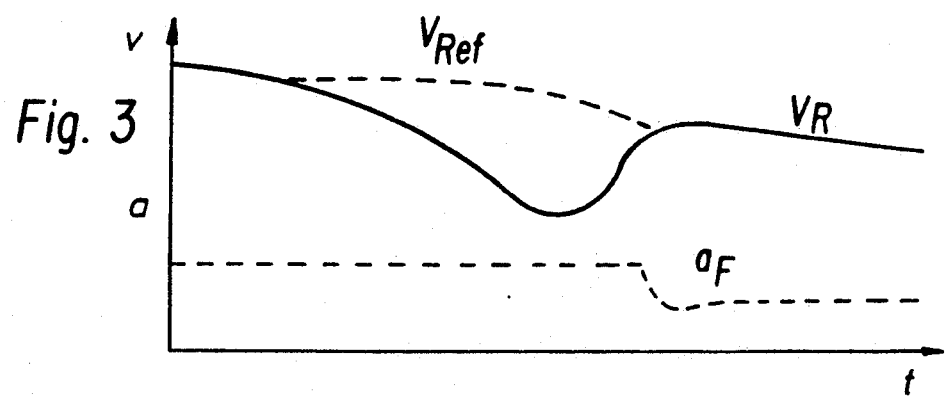
Figure 4A:
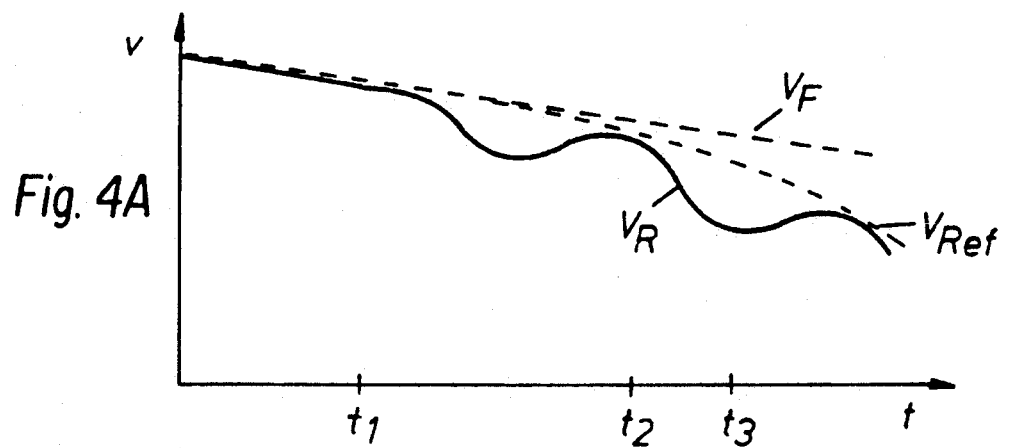
FIGS. 4–6 and 8 are explanatory time diagrams illustrating the operation of the anti-skid brake control system of the present invention.
Figure 4B:
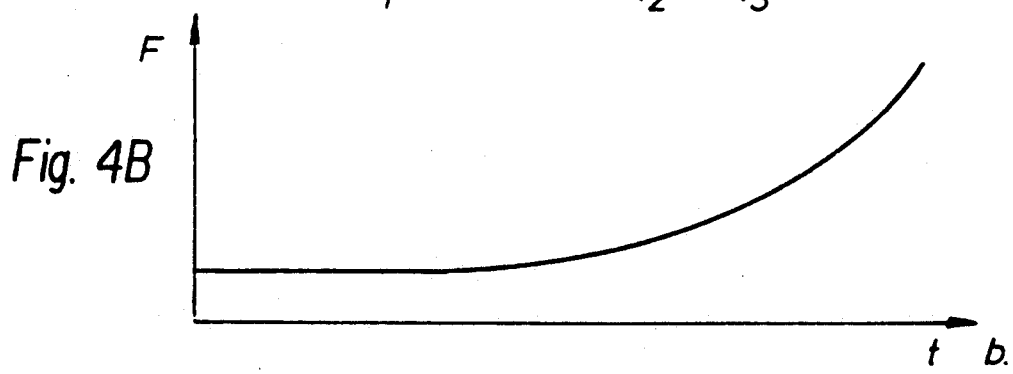
Figure 5:
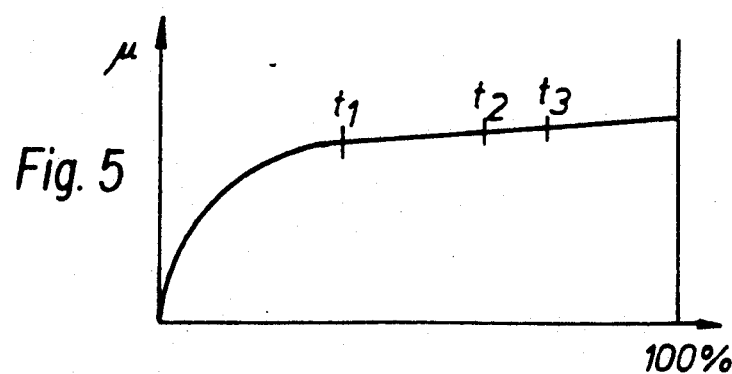
Figure 6A:
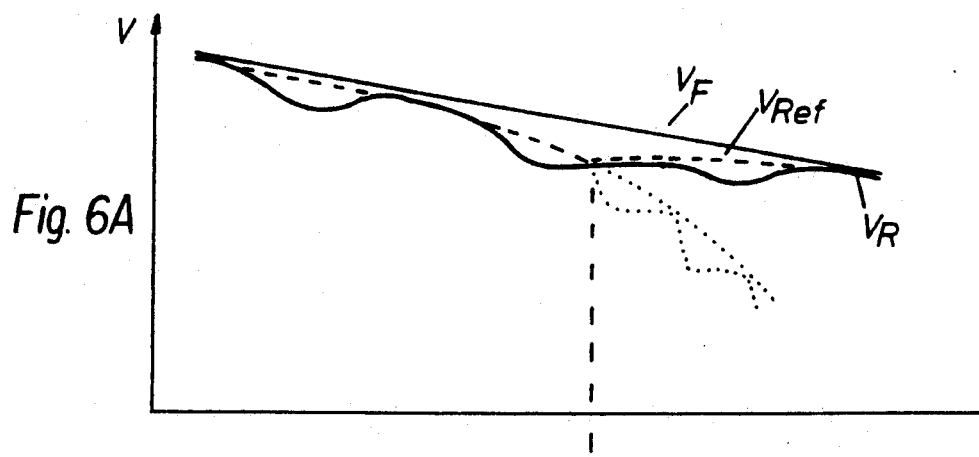
Figure 6B:
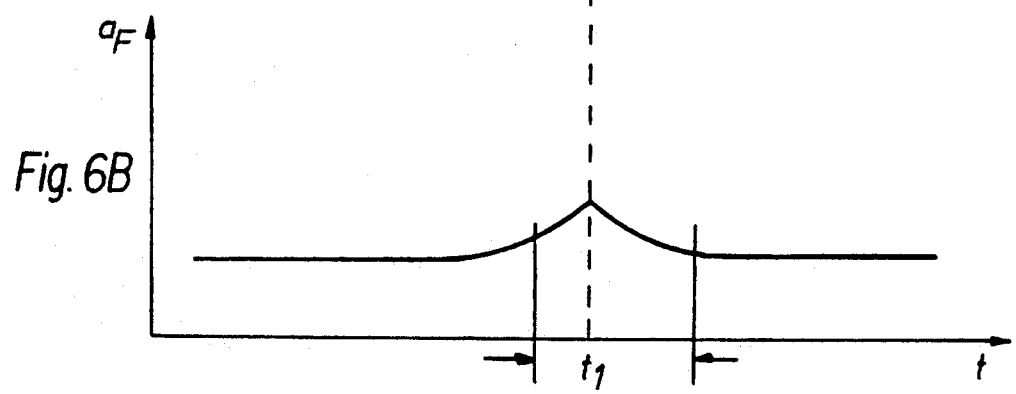

From the diagram of FIG. 3, in which the reference speed $V_{Ref}$, the wheel speed $V_R$ and the calculated vehicle deceleration $a_F$ are indicated over the time, it is possible to see the progressive relationship between vehicle deceleration and the slope of the reference speed. In a slippage curve, as represented in FIG. 5, it is possible, that the calculated vehicle deceleration $a_F$ increases, as represented in FIG. 4b, thus resulting in a change of the reference value $V_{Ref}$ such that the latter more and more departs from the vehicle speed $V_{R1}$ as shown in FIG. 4a. In this case, the wheels will lock despite the anti-lock braking system. However, the above described blocking of the pressure build-up during a vehicle deceleration higher than the wheel deceleration causes behavior such as that represented in FIG. 6a. The unblocked parameters are indicated in dotted lines. Before $t_1$ in the illustrated version the brake pressure build-up is blocked such that the wheel speed $V_R$ does not further decrease and supports the reference value $V_{ref}$ after $t_1$. FIG. 6b shows the corresponding characteristic of the vehicle deceleration $a_f$.

Figure 7:
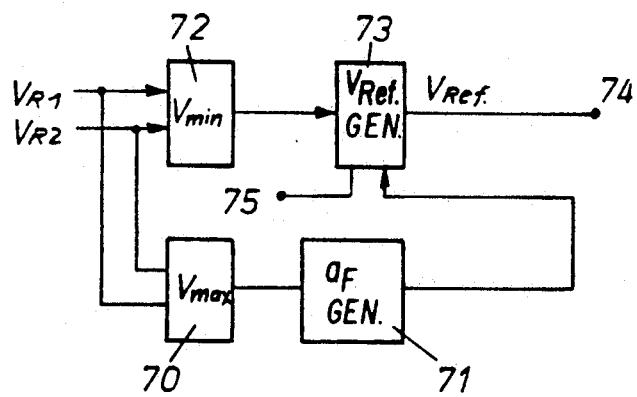
FIGS. 7 and 9 are block diagrams of circuits which provide alternatives too the embodiment of FIG. 2.

The embodiment in FIG. 7 operates with a supplementary reference value. In a unit 70 the maximum value is again formed from the wheel speeds $V_{R1}$ and $V_{R2}$ and this maximum value is supplied to a unit 71 that assumes the functions of units 21 and 23; this unit 71 consequently outputs the slope of the determined reference speed and supplies this slope to a unit 73.

Figure 8:
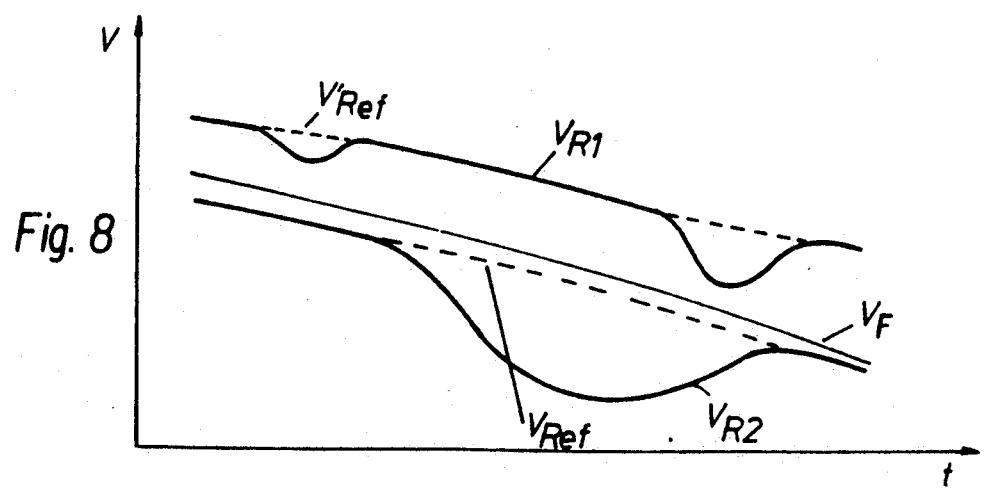

Proceeding on the assumption that the wheel speeds $V_{R1}$ and $V_{R2}$ are included in the formation of the reference value, the unit 72, selecting the respectively smaller value, can determine the second fastest wheel speed. In the unit 73, which corresponds to units 21 and 22 of FIG. 2, the actual speed reference value (terminal 74) is determined based on the calculated vehicle deceleration (from unit 71) and the percentage (terminal 75). FIG. 8 shows the corresponding diagram for the emergency wheel. The wheel $R_1$ is the emergency wheel which is smaller in diameter than the normal wheels. $V_{R1}$ is the characteristic curve for this wheel and in case a wheel locking is likely to occur, the supplementary reference value $V'_{ref}$ can take effect. $V_{R1}$, and partially $V'_{Ref}$, determine the vehicle deceleration speed which is used to determine the slope of the actual reference speed value $V_{ref}$ in the case where $V_R < V_{Ref}$.

Figure 9:
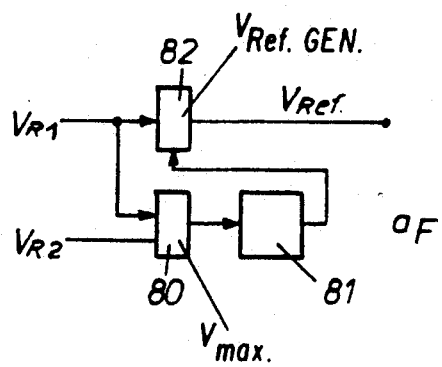

FIG. 9 illustrates again the formation of a supplementary reference speed within a unit 81 from the maximum values of the wheel speeds $V_{R1}$ and $V_{R2}$ (unit 80) which affords the basis to determine the vehicle deceleration $a_F$. This deceleration is used by a unit 82 to determine the slope of the reference speed value $V_{Ref}$ in the case where $V_R < V_{Ref}$. This reference speed value serves only for the slippage formation at the wheel $R_1$.

There has thus been shown and described a novel automatic anti-skid brake control system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modification, variations and other uses and applications which do not depart from the spirit and scope of the invention are deemed to be covered by the invention which is limited only by the claims which follow.

We claim:

1. In an anti-skid brake control system for a motor vehicle having a plurality of vehicle wheels, said system comprising, in combination:
    (1) wheel speed sensors for producing wheel speed signals representative of the rotational speeds of the respective vehicle wheels;
    (2) evaluation circuit means, responsive to the wheel speed signals of said sensors, for determining a reference speed that approximates the speed of said vehicle, and for producing brake control signals in dependence upon slippage values generated from said reference speed and said wheel speed signals; and
    (3) brake pressure control means, responsive to said brake pressure control signals, for varying the brake pressure applied to said vehicle wheels;
    the improvement wherein said evaluation circuit means includes means for determining the vehicle deceleration from change values between several successively determined reference speeds, and wherein said vehicle deceleration, so determined, is used to define the slopes of said reference speed during periods of braking instability.

2. The anti-skid brake control system in accordance with claim 1, wherein said slope of said reference speed during the periods of instability is modified to be higher than the value of deceleration of said vehicle by a prescribed amount.

3. An anti-skid brake control system in accordance with claim 1, wherein said vehicle deceleration determining means includes digital circuit means for summing successively determined changes $\Delta_V$ of said reference speed in successive periods of time in accordance with their sign.

4. An anti-skid brake control system in accordance with claim 1, wherein said vehicle deceleration determining means includes digital circuit means for storing a plurality n of successively determined change values V between successively determined reference speeds, such that the oldest stored value is deleted upon storage of a new change value (n+1), said vehicle deceleration determining means including means for summing the stored change values V together after each new change value is stored.

5. An anti-skid brake control system in accordance with claim 1, wherein said vehicle deceleration determining means includes digital circuit means for determining the sum of successively determined change values of said reference speed; means for dividing said sum, so determined, by a prescribed factor to obtain a quotient; and means for subtracting said quotient from said sum to obtain a remainder, wherein the vehicle deceleration is set equal to said remainder.

6. An anti-skid brake control system in accordance with claim 1, wherein said evaluation circuit means determines the vehicle deceleration from the sum of the change values which occur between decreases in vehicle acceleration.

7. An anti-skid brake control system in accordance with claim 2, wherein the value by which the slope of the reference speed is higher than the vehicle deceleration is a function of a brake pressure build-up value after a pressure drop.

8. An anti-skid brake control system in accordance with claim 1, wherein the calculated vehicle deceleration is compared to the deceleration of a vehicle wheel and a brake pressure build-up is inhibited if the wheel deceleration is smaller than the calculated vehicle deceleration.

9. An anti-skid brake control system in accordance with claim 1 wherein
    the reference speed for determining the slippage is generated from the speed of the second fastest rotating wheel,
    a supplementary reference speed is generated from the speed of the fastest rotating wheel, and
    the vehicle deceleration is determined from change values between several successively determined values of the supplementary reference speed, and said vehicle deceleration, so determined, is used to determine the slope of said reference speed during said periods of braking instability.

* * * * *